United States Patent
Kajino et al.

(10) Patent No.: US 10,317,000 B2
(45) Date of Patent: Jun. 11, 2019

(54) DUCT FLANGE STRUCTURE, AND MANUFACTURING METHOD FOR THE SAME

(71) Applicant: SHINFUJI KUUCHOU CO., LTD., Kounosu-shi, Saitama (JP)

(72) Inventors: Isamu Kajino, Kounosu (JP); Naoki Hashimoto, Kounosu (JP); Tomotsugu Noguchi, Kounosu (JP); Takaaki Uchikawa, Kashiwa (JP)

(73) Assignee: SHINFUJI KUUCHOU CO., LTD., Kounosu-shi, Saitama (JP)

( * ) Notice: Subject to any disclaimer, the term of this patent is extended or adjusted under 35 U.S.C. 154(b) by 446 days.

(21) Appl. No.: 15/068,520

(22) Filed: Mar. 11, 2016

(65) Prior Publication Data
US 2016/0238168 A1     Aug. 18, 2016

Related U.S. Application Data (63) Continuation-in-part of application No. 14/944,144, filed on Nov. 17, 2015, now abandoned.

(30) Foreign Application Priority Data

Feb. 17, 2015   (JP) .................................. 2015-28387

(51) Int. Cl.
| | |
|---|---|
| *F16L 23/14* | (2006.01) |
| *B21D 19/16* | (2006.01) |
| *F24F 13/02* | (2006.01) |

(52) U.S. Cl.
CPC .............. *F16L 23/14* (2013.01); *B21D 19/16* (2013.01); *F24F 13/0209* (2013.01)

(58) Field of Classification Search
CPC ....... F16L 23/14; F24F 13/0209; B21D 19/16
(Continued)

(56) References Cited

U.S. PATENT DOCUMENTS

| | | | | |
|---|---|---|---|---|
| 3,199,901 A | * | 8/1965 | Jeppsson | F16L 23/14 138/159 |
| 4,123,094 A | * | 10/1978 | Smitka | F16L 23/14 285/405 |

(Continued)

FOREIGN PATENT DOCUMENTS

| | | | |
|---|---|---|---|
| JP | 2010139204 A | * | 6/2010 |
| WO | WO 2012/023407 A1 | | 2/2012 |
| WO | WO 2014/116820 A1 | | 7/2014 |

OTHER PUBLICATIONS

Search Report of related Singaporean patent application No. 10201508614Y dated May 11, 2016.

*Primary Examiner* — David Bochna
*Assistant Examiner* — James A Linford
(74) *Attorney, Agent, or Firm* — Arent Fox LLP (57) ABSTRACT

A duct flange structure which has a higher strength and which is easier to handle and manufacture. The duct flange structure is arranged in an end portion of a duct body having a substantially quadrilateral shape in section that includes a flange portion formed by bending an extension portion extending from an opening edge of each of wall plates constituting the duct body, the flange portion being constituted by a vertical portion extending outside substantially vertically to the wall plate and a horizontal portion extending substantially parallel to the wall plate from the vertical portion, the vertical portion and the horizontal portion being formed by folding and superposing the extension portion in two layers so as to form two adjacent wall portions.

10 Claims, 7 Drawing Sheets

(58) Field of Classification Search
USPC .......................................................... 285/424
See application file for complete search history.

(56) References Cited

U.S. PATENT DOCUMENTS

| | | | | |
|---|---|---|---|---|
| 4,410,206 A | * | 10/1983 | Mez | F24F 13/0209 |
| | | | | 285/405 |
| 4,466,641 A | | 8/1984 | Heilman et al. | |
| 4,865,365 A | * | 9/1989 | Meinig | F16L 23/14 |
| | | | | 285/412 |
| 5,133,580 A | * | 7/1992 | Meinig | F16L 23/026 |
| | | | | 285/363 |
| 6,471,256 B1 | * | 10/2002 | Fischer | B23P 19/04 |
| | | | | 285/368 |
| 2005/0224125 A1 | | 10/2005 | Kajino | |
| 2011/0121569 A1 | * | 5/2011 | Hermanson | F16L 9/165 |
| | | | | 285/405 |

* cited by examiner

DUCT FLANGE STRUCTURE, AND MANUFACTURING METHOD FOR THE SAME

TECHNICAL FIELD

The present invention relates to a duct flange structure which is arranged in an end portion of a duct body of a duct and connects the duct with another duct or the like, and a manufacturing method for the duct flange structure.

BACKGROUND ART

A duct body having a substantially quadrilateral cross-sectional shape in section is provided at an opening end thereof with a flange extending along the opening edge for connecting the duct to another duct or the like. Specifically, a common-plate flange is formed by bending an end portion of each of steel plates constituting a duct body, then the surfaces of two such flanges are joined together and those flanges are held by means of flange-holding metal fittings (clips). In the corners of the flanges, corner pieces are provided, and the flanges are fastened there with bolts, thereby connecting the two ducts and the like (e.g., refer to Non-Patent Document 1).

There is, for example, a smoke-extraction duct for extracting smoke at the outbreak of a fire. This duct takes in air having a higher pressure than an ordinary duct does (e.g., threefold). Hence, the smoke-extraction duct requires a flange having a higher strength and rigidity, and the flange is formed by an angle material. Specifically, the flange is formed by connecting an angle material (angle steel) having a substantially L-shape in section to an opening end portion of a duct body by means of riveting or welding. The flange is formed with bolt insertion holes at predetermined intervals. Two such flanges are fastened by joining the surfaces of those flanges together and inserting bolts into the bolt insertion holes, thereby making the connection of the two ducts or the like (e.g., refer to Non-Patent Document 2). Besides, the angle material forming the flange is subjected to a coating, thereby inhibiting corrosion of the angle material.

RELATED ART DOCUMENTS

[Non-Patent Document 1] pp. 39-40 of "Standard Duct Text" edited and issued in July 2013 by National Duct Manufacturers Association as general incorporated association.

[Non-Patent Document 2] p. 37 of "Standard Duct Text" edited and issued in July 2013 by National Duct Manufacturers Association as general incorporated association.

SUMMARY OF THE INVENTION

An angle material is thicker and heavier than a steel plate forming a duct body, thereby raising the total weight of a smoke-extraction duct. This makes it hard to handle the duct, for example, to carry or install the duct. Further, angle materials need employing in addition to steel plates constituting a duct body, thereby raising the cost of duct components and requiring welding or coating work. As a result, a great deal of cost and labor are necessary for manufacturing the duct. Still further, welding or coating worsens the manufacturing work environment, thereby imposing a heavy burden on manufacturing workers.

Therefore, it is an object of the present invention to provide a duct flange structure which has a higher strength and which is easier to handle and manufacture, and a manufacturing method for the duct flange structure.

In order to accomplish the object, a duct flange structure according to claim 1 which is arranged in an end portion of a duct body having a substantially quadrilateral shape in section, comprises: a flange portion formed by bending an extension portion extending from an opening edge of each of wall plates constituting the duct body, the flange portion being constituted by a vertical portion extending outside substantially vertically to the wall plate and a horizontal portion extending substantially parallel to the wall plate from the vertical portion, the vertical portion and the horizontal portion being formed by folding and superposing (also interchangeably referred to herein as being bent "double back") the extension portion in two or more layers.

According to claim 2, in the duct flange structure of claim 1, the extension portion extends toward the opening edge of the wall plate and is folded and superposed.

According to claim 3, in the duct flange structure of claim 1 or 2, the vertical portion is formed with a bolt insertion hole for inserting a bolt into the vertical portion.

According to claim 4, in the duct flange structure of claims 1 to 3, the edge of the extension portion is inside of the duct body.

According to claim 5, in the duct flange structure of claims 1 to 4: the extension portion is formed with a cutout portion located inside of the horizontal portion and extending from a side edge of the horizontal portion; and a corner piece is provided in a corner of an opening end portion of the duct body, the corner piece having two plate-shaped attachment portions in a substantially L-shape, one edge of each attachment portion being attached and fixed to the cutout portion.

According to claim 6, in the duct flange structure of claim 5: the wall plate is formed with a rib portion protruding outside; and the other edge of each attachment portion of the corner piece is attached and fixed between the rib portion and the vertical portion.

According to claim 7, a manufacturing method for the duct flange structure according to any one of claims 1 to 6 comprises the steps of: folding and superposing the extension portion in two or more to form a superposition portion; and bending the superposition portion to form the vertical portion and the horizontal portion.

According to claim 8, a manufacturing method for the duct flange structure according to claim 5 comprises the steps of: forming the extension portion with the cutout portion; folding and superposing the extension portion in two or more to form a superposition portion; and bending the superposition portion to form the vertical portion and the horizontal portion.

In the duct flange structure of claim 1, the flange portion constituted by the vertical portion and the horizontal portion is formed by folding and superposing the extension portion of the wall plate in two or more. Therefore, the flange portion has a higher strength and rigidity, and hence, the flange portion is applicable to a smoke-extraction duct and the like. Further, the vertical portion and the horizontal portion are formed by the extension portion of the wall plate, in other words, by a steel plate or the like having the same thickness as the duct body, thereby lightening the total weight of the duct. This facilitates handling the duct, for example, carrying or installing the duct.

Moreover, the wall plate is lengthened to form the extension portion, thereby dispensing with angle materials or the like, apart from steel plates or the like constituting the duct body, and hence lowering the cost of duct components. Further, welding or coating is dispensable and bending work for the extension portion is only needed, thereby lessening the cost and labor for manufacturing the duct. Still further, welding or coating is not conducted, and hence, the manufacturing work environment is kept better, thereby reducing the burden on manufacturing workers.

In the duct flange structure of claim 2, the extension portion extends toward the opening edge of the wall plate and is folded and superposed. Therefore, the wall plate becomes stronger and more rigid on the opening-edge side thereof, in other words, the flange portion becomes stronger and more rigid on the root side thereof, thereby further enhancing the strength and rigidity of the flange portion.

In the duct flange structure of claim 3, the vertical portion is formed with the bolt insertion hole. Therefore, two such flanges can be fastened by inserting a bolt into the bolt insertion holes. Accordingly, the flanges are more strongly connected, thereby preventing the duct from falling off.

In the duct flange structure of claim 4, the edge of the extension portion is inside of the duct body. Therefore, the edge of the extension portion is invisible from the outside, and hence, the external appearance becomes better. Besides, workers can be prevented from touching the edge of the extension portion to sustain injuries or the like.

In the duct flange structure of claim 5, the one edge of the attachment portion of the corner piece is attached and fixed to the cutout portion of the horizontal portion. Therefore, it is unnecessary to bend (caulk) the horizontal portion to fix the corner piece to the flange portion, thereby lessening the labor and time. In other words, it takes a great deal of labor and time to bend the horizontal portion formed by folding and superposing the extension portion of the wall plate in two or more. In contrast, the one edge of the attachment portion of the corner piece is simply attached to the cutout portion, thereby fixing the one edge of the attachment portion to the flange portion with ease and in a short time.

In the duct flange structure of claim 6, the other edge of the attachment portion of the corner piece is attached and fixed between the rib portion of the wall plate and the vertical portion of the flange portion. This enables the corner piece to be securely fixed to the flange portion. To sum up, the one edge of the attachment portion of the corner piece is attached and fixed to the cutout portion and the other edge of the attachment portion is attached and fixed between the rib portion and the vertical portion, so that the corner piece can be securely fixed to the flange portion.

In the manufacturing method for the duct flange structure of claim 7, the extension portion is folded and superposed in two or more to form the superposition portion, and thereafter, the vertical portion and the horizontal portion are formed. In other words, there is no need to repeatedly form and superpose the vertical portion and the horizontal portion. Therefore, the vertical portion and the horizontal portion corresponding to the superposition of the extension portion can be more easily and properly formed, so that the flange can be manufactured more easily and at a lower cost.

In the manufacturing method for the duct flange structure of claim 8, the extension portion is formed in advance with the cutout portion, the extension portion is folded and superposed in two or more to form the superposition portion, and thereafter, the vertical portion and the horizontal portion are formed. In other words, there is no need to form the cutout portion after forming the vertical portion and the horizontal portion. Therefore, the horizontal portion having the cutout portion is more easily and properly formed, so that the flange can be manufactured more easily and at a lower cost.

DETAILED DESCRIPTION

Embodiments of the present invention will be below described with reference to the drawings.

First Embodiment

Figure 1:
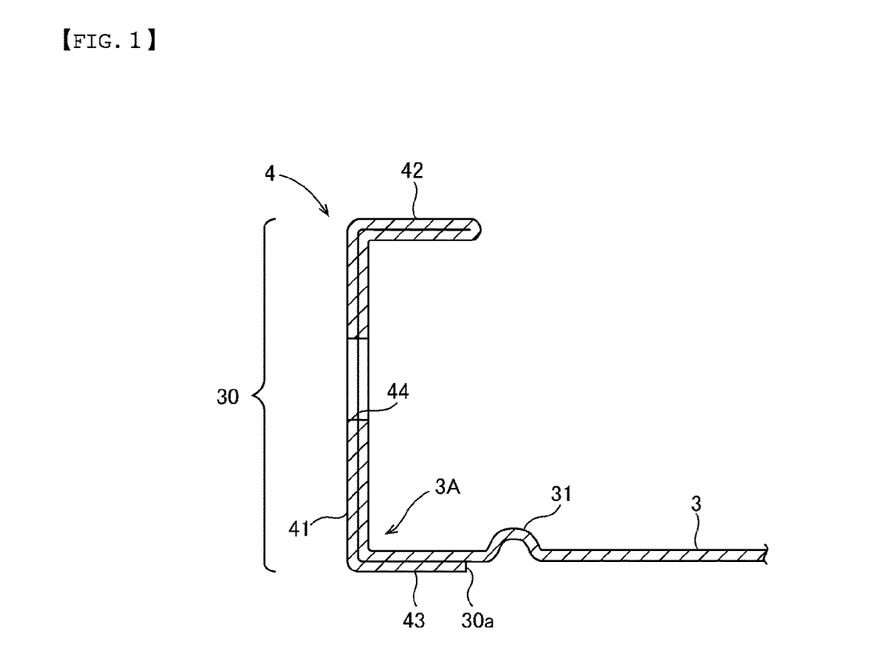
FIG. 1 is a sectional view (along the A-A line of FIG. 3) of a duct flange structure according to a first embodiment of the present invention.
Figure 2:
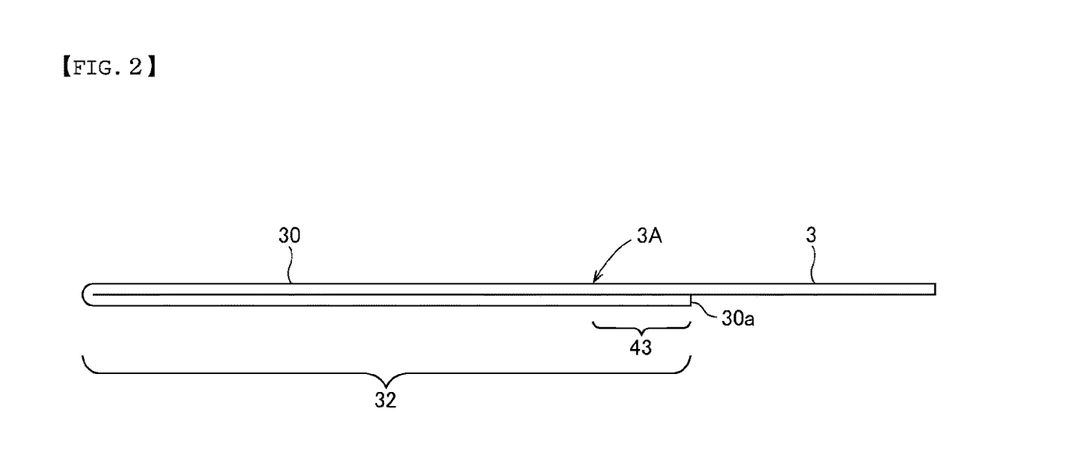
FIG. 2 is a side view of a superposition portion in a manufacturing process of the duct flange structure of FIG. 1.
Figure 3:
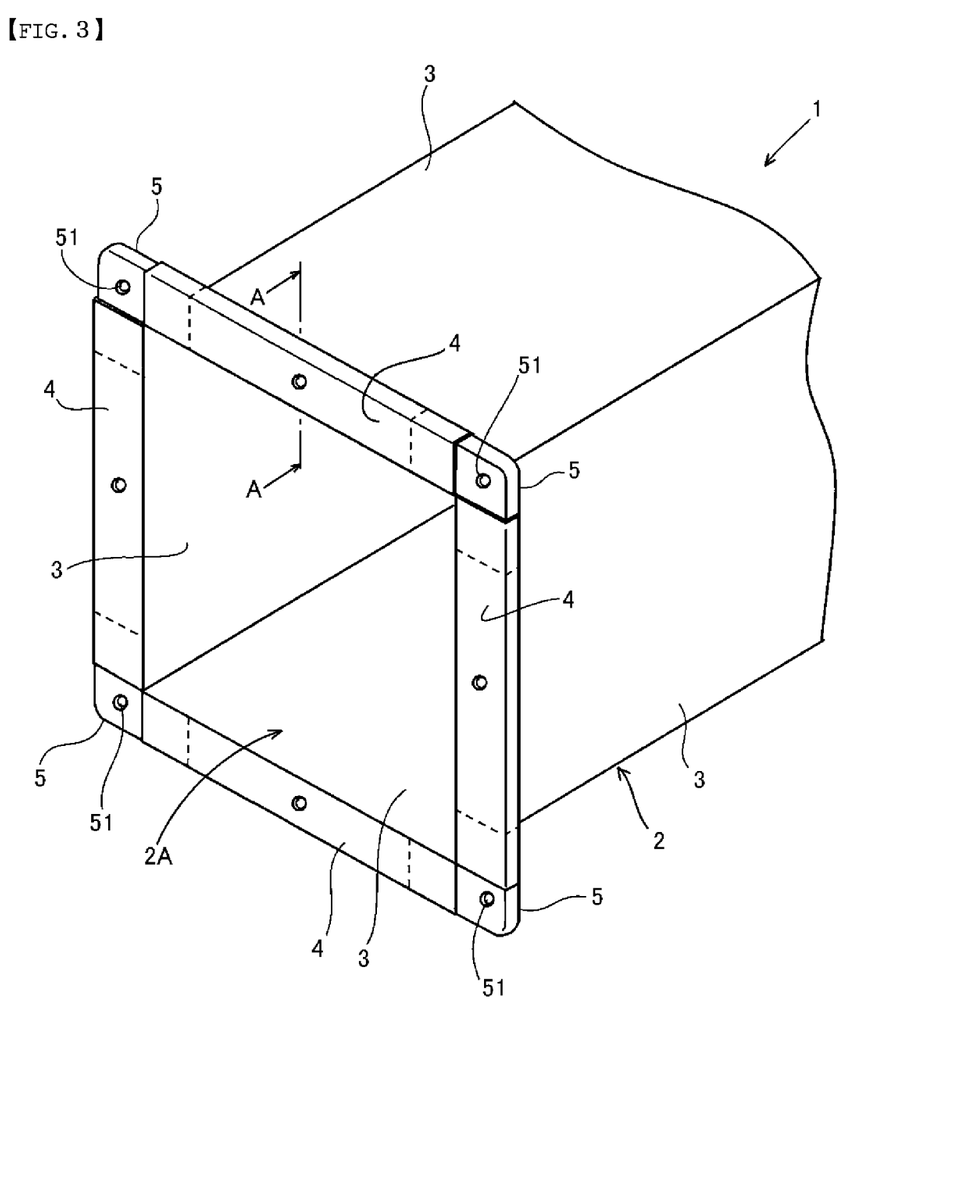
FIG. 3 is a perspective view of a duct provided with the duct flange structure of FIG. 1.

FIGS. 1 to 3 show a first embodiment of the present invention. FIG. 3 is a perspective view of a duct 1 provided with a duct flange structure according to this embodiment. The duct flange structure is a flange structure which is arranged in an opening end portion 2A of a duct body 2 and which connects the duct 1 to another duct or the like. FIG. 1 shows a close-up cross-sectional view of one plate 3, which is also herein interchangeably referred to as a "plate portion," of the duct body 2 (FIG. 3), including a formed example extension portion 30. As shown in FIG. 3, the duct body may include four of the aforementioned plate portion (s) 3 intersecting one one-another and forming duct body 2.

The duct body 2 has a duct body having a substantially quadrilateral shape in section and is constituted by four wall plates 3 each of which is a corrosion-resisting steel plate. Specifically, the duct body 2 is formed by arranging the substantially rectangular wall plates 3 in a quadrilateral barrel shape and joining the side edges of the adjoining wall plates 3. The joint portions of the wall plates 3 may be fixed, or alternatively, the wall plates 3 may be freely pivoted on the joint portions (the duct body 2 may be freely folded up).

The duct body 2 is provided with a flange formed in at least one opening end portion 2A. Specifically, a flange portion 4 is formed in the opening end portion 2A of each wall plate 3, and the four flange portions 4 are arranged in a rectangular ring shape to form the flange. Between the end parts of the adjoining flange portions 4, in other words, in the four corners of the opening end portion 2A of the duct body 2, a corner piece 5 is individually provided, and the corner piece 5 is an L-shaped flat plate. The corner piece 5 is formed, in the corner thereof, with a corner bolt insertion hole 51 for inserting a bolt.

Each flange portion 4 is formed by bending an extension portion 30 extending from an opening edge 3A of the wall plate 3 and is constituted by a vertical portion 41, which is also herein interchangeably referred to as a "first extending flange portion," extending outside substantially vertically perpendicularly to the wall plate 3 and a horizontal portion 42, which is also herein interchangeably referred to as a "third extending portion," extending substantially parallel to the wall plate 3 from the vertical the location where portion 42 joins portion 41 (FIG. 1). In other words, as shown in FIG. 1, the extension portion 30 corresponds to the part of the steel plate which extends from the opening edge 3A of the wall plate 3 located at the opening end portion 2A (FIG. 3) of the duct body 2 (FIG. 3). As shown in FIG. 1, the extension portion 30 is bent into the a vertical portion 41 as shown in FIG. 1 and the a horizontal portion 42 as shown in FIG. 1. As shown in FIG. 1, the vertical portion 41 extends substantially vertically to the wall plate 3 in the direction opposite to the inside of the duct body 2 (in the outside direction thereof, as shown in FIG. 3). The horizontal portion 42 extends substantially parallel to the wall plate 3, as shown in FIG. 1 from the free-end part (the part opposite to the wall plate 3) of the vertical portion 41. Hence, the flange portion 4 unites with the wall plate 3 and extends over the full length of the opening edge 3A of the wall plate 3.

The vertical portion 41 and the horizontal portion 42 are formed by folding and superposing the extension portion 30 in two or more layers that are doubled back on themselves, for example. In this embodiment, the vertical portion 41 and the horizontal portion 42 are formed by folding and superposing the steel plate equivalent to the extension portion 30 in two. The vertical portion 41 is a connection surface part coming into contact with a flange of another duct or the like and has a height portion connectable with a flange of another duct or the like. The horizontal portion 42 is a fixing part for fixing the corner piece 5 (FIG. 3) by bending the horizontal portion 42 toward the vertical portion 41. The horizontal portion 42 has a length suitable for holding and fixing the corner piece 5 between the bent horizontal portion 42 and the vertical portion 41.

The extension portion 30 extends toward the opening edge 3A of the wall plate 3 in one direction and is folded and superposed. Specifically, the free-end part (ending at edge 30a) of the extension portion 30 extends from the opening edge 3A toward the middle of the wall plate 3 and is superposed on the wall plate 3. This superposition part (second horizontal portion 43) is designed to have a length enough to give the second horizontal portion 43 equivalent to the root of the flange portion 4 a specified bending strength and the like.

An edge 30a of the extension portion 30 is located inside of the duct body 2. Specifically, the extension portion 30 is bent to position the free-end part of the extension portion 30 on the internal-surface side of the wall plate 3 (on the inside of the duct body 2). Accordingly, the edge 30a of the free-end part of the extension portion 30 is inside of the duct body 2.

The vertical portion 41 is formed with a bolt insertion hole 44 for inserting a bolt. The diameter of the bolt insertion hole 44 and the number of the bolt insertion holes 44, or the diameter of a bolt and the number of bolts, are designed on the basis of the size or weight of the duct body 2, the length of the flange portion 4 and the like, such that the duct has a specified connection strength. Near the second horizontal portion 43, the wall plate 3 is formed with a rib portion 31 protruding outside, so that the corner piece 5 can be held and fixed between the rib portion 31 and the vertical portion 41.

Next, a manufacturing method will be described for the flange portion 4 (the duct flange structure).

First, as shown in FIG. 2, the extension portion 30 equivalent to the steel plate extending from the opening edge 3A of the wall plate 3 is folded and superposed in two to form a superposition portion 32. In FIG. 2, the extension portion 30 ranges from the opening edge 3A up to the edge 30a, and the extension portion 30 is designed to have a length enough to form the vertical portion 41, the horizontal portion 42 and the second horizontal portion 43. In order to form the second horizontal portion 43, the free-end part of the extension portion 30 is brought toward the wall plate 3 from the opening edge 3A, and the extension portion 30 is folded and superposed in two.

Thereafter, the superposition portion 32 is formed at a predetermined position thereof with the bolt insertion hole 44, and sequentially, the superposition portion 32 is bent into the vertical portion 41 and the horizontal portion 42. Specifically, the superposition portion 32 on the free-end side (the opposite side to the wall plate 3) thereof is substantially vertically bent to form the horizontal portion 42. Then, the superposition portion 32 is substantially vertically bent along the opening edge 3A (the position where the opening edge 3A is to be formed) to form the vertical portion 41. In this process, the horizontal portion 42 may be formed after the vertical portion 41 has been formed, or alternatively, the vertical portion 41 may be formed after the horizontal portion 42 has been formed. In the case where the wall plates 3 are joined together by side seaming, the wall plates 3 are formed along the side edges with seams, and the seams may be formed after the vertical portion 41 and the horizontal portion 42 have been formed, or alternatively, before the vertical portion 41 and the horizontal portion 42 are formed.

As described so far, in the duct flange structure, the flange portion 4 constituted by the vertical portion 41 and the horizontal portion 42 is formed by folding and superposing the extension portion 30 of the wall plate 3 in two. Therefore, the flange portion 4 has a higher strength and rigidity, and hence, the flange portion 4 is applicable to a smoke-extraction duct and the like. Further, the vertical portion 41 and the horizontal portion 42 are formed by the extension portion 30 of the wall plate 3, in other words, by a steel plate having the same thickness as the duct body 2, thereby lightening the total weight of the duct 1. This facilitates handling the duct 1, for example, carrying or installing the duct 1.

Moreover, the wall plate 3 is lengthened to form the extension portion 30, thereby dispensing with angle materials or the like, apart from steel plates constituting the duct body 2, and hence lowering the cost of duct components. Further, welding or coating is dispensable and bending work for the extension portion 30 is only needed, thereby lessening the cost and labor for manufacturing the duct 1. Still further, welding or coating is not conducted, and hence, the manufacturing work environment is kept better, thereby reducing the burden on manufacturing workers.

In addition, the extension portion 30 extends toward the opening edge 3A of the wall plate 3 and is folded and superposed, and the second horizontal portion 43 is formed. Therefore, the wall plate 3 becomes stronger and more rigid on the side of the opening edge 3A, in other words, the flange portion 4 becomes stronger and more rigid on the root side thereof, thereby further enhancing the strength and rigidity of the flange portion 4.

Furthermore, the vertical portion 41 is formed with the bolt insertion hole 44. Therefore, two such flanges can be fastened by inserting a bolt into the bolt insertion holes 44. Accordingly, the flanges are more strongly connected, thereby preventing the duct 1 from falling off.

Moreover, the edge 30*a* of the extension portion 30 is inside of the duct body 2. Therefore, the edge 30*a* of the extension portion 30 is invisible from the outside, and hence, the external appearance becomes better. Besides, workers can be prevented from touching the edge 30*a* of the extension portion 30 to sustain injuries or the like.

Furthermore, in the above manufacturing method for the flange portion 4, the extension portion 30 is folded and superposed in two to form the superposition portion 32, and thereafter, the vertical portion 41 and the horizontal portion 42 are formed. In other words, there is no need to repeatedly form the vertical portion 41 and the horizontal portion 42 and superpose one on top of another. Therefore, the vertical portion 41 and the horizontal portion 42 corresponding to the superposition of the extension portion 30 can be more easily and properly formed, so that the flange can be manufactured more easily and at a lower cost.

Second Embodiment

Figure 4:
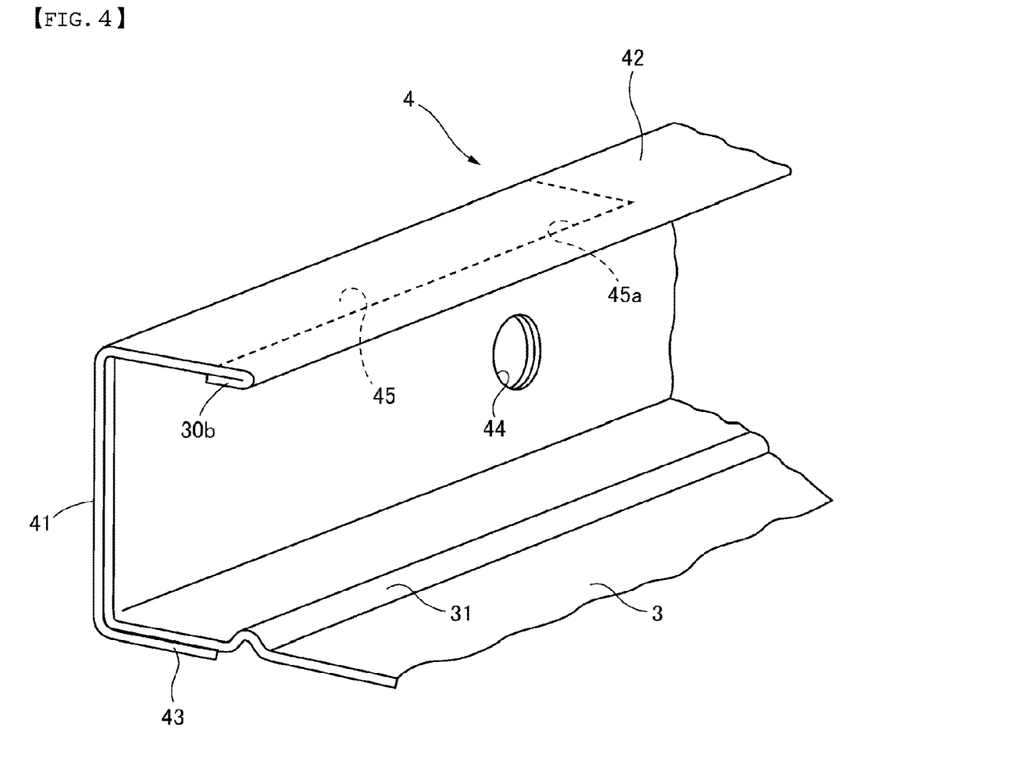
FIG. 4 is a perspective view of a duct flange structure according to a second embodiment of the present invention.

FIGS. 4 to 11 show a second embodiment of the present invention. FIG. 4 is a perspective view of a portion of a duct flange structure according to this embodiment. The embodiment is different from the first embodiment in the respect that the horizontal portion 42 is formed with a cutout portion 45. The other component elements of the second embodiment are given the same reference characters and numerals as those of the first embodiment, as long as the former are identical to the latter. Thus, their description is omitted.

Figure 5:
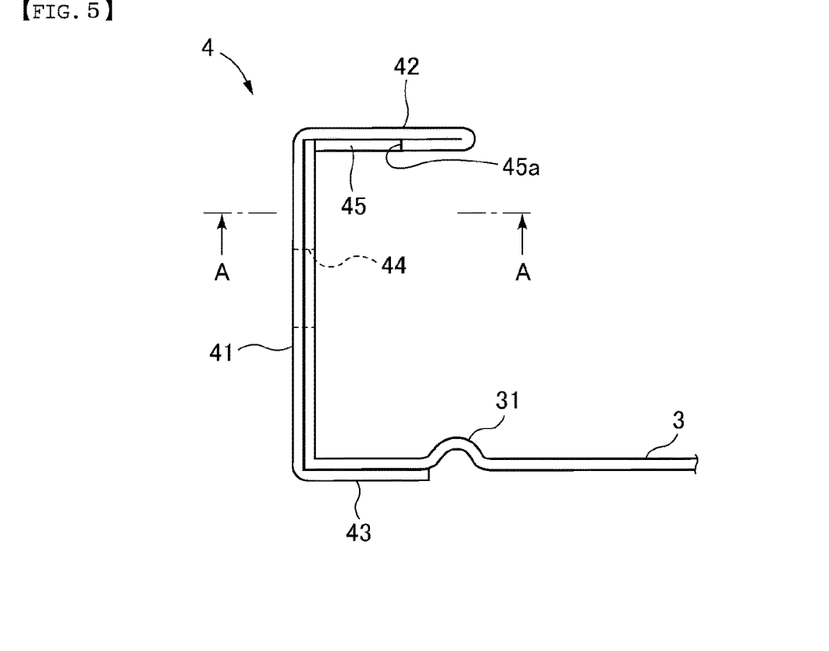
FIG. 5 is a side view of the duct flange structure of FIG. 4.
Figure 6:
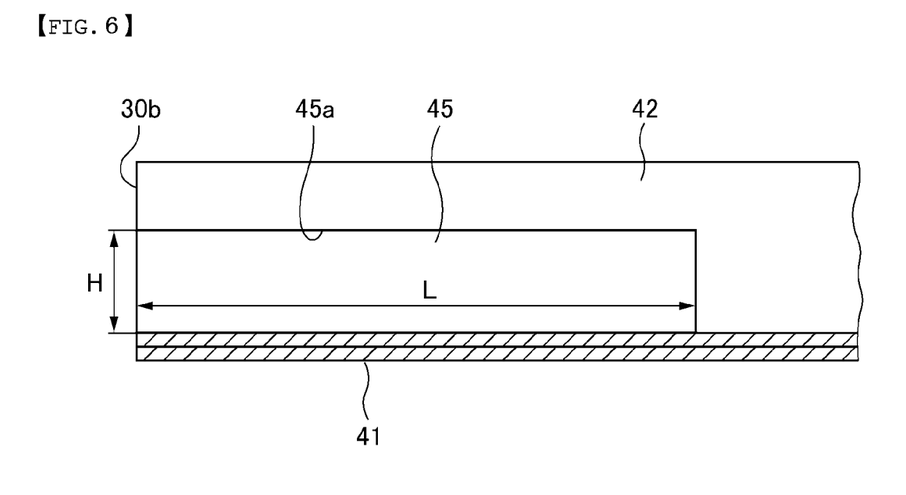
FIG. 6 is a sectional view along the A-A line of the duct flange structure of FIG. 5.

In the flange portion 4 of this embodiment, the extension portion 30 is formed with the cutout, portion 45 located inside of the horizontal portion 42 and extending from a side edge 30*b*, which is also herein interchangeably referred to as a "second extending flange portion." One edge 521 of an attachment portion 52 of the corner piece 5, which is also interchangeably referred to herein as a "reinforcing corner piece," is attached and fixed to the cutout portion 45. Specifically, as shown in FIGS. 5 and 6, in the superposition part of the extension portion 30 which forms the horizontal portion 42, the part of the extension portion 30 facing the second horizontal portion 43 (the wall plate 3) is formed with the cutout portion 45 extending from the side edge 30*b*.

The cutout portion 45 is formed from the boundary between the vertical portion 41 and the horizontal portion 42, and has a width H (the distance from the vertical portion 41 up to a cutout portion edge 45*a*) slightly larger than the height of the one edge 521 of the corner piece 5. The cutout portion 45 has a length L which is greater than the length of the attachment portion 52 of the corner piece 5. In this embodiment, as shown in FIG. 4, the vertical portion 41 is formed on the side of the side edge 30*b* with another such bolt insertion hole 44.

Figure 7:
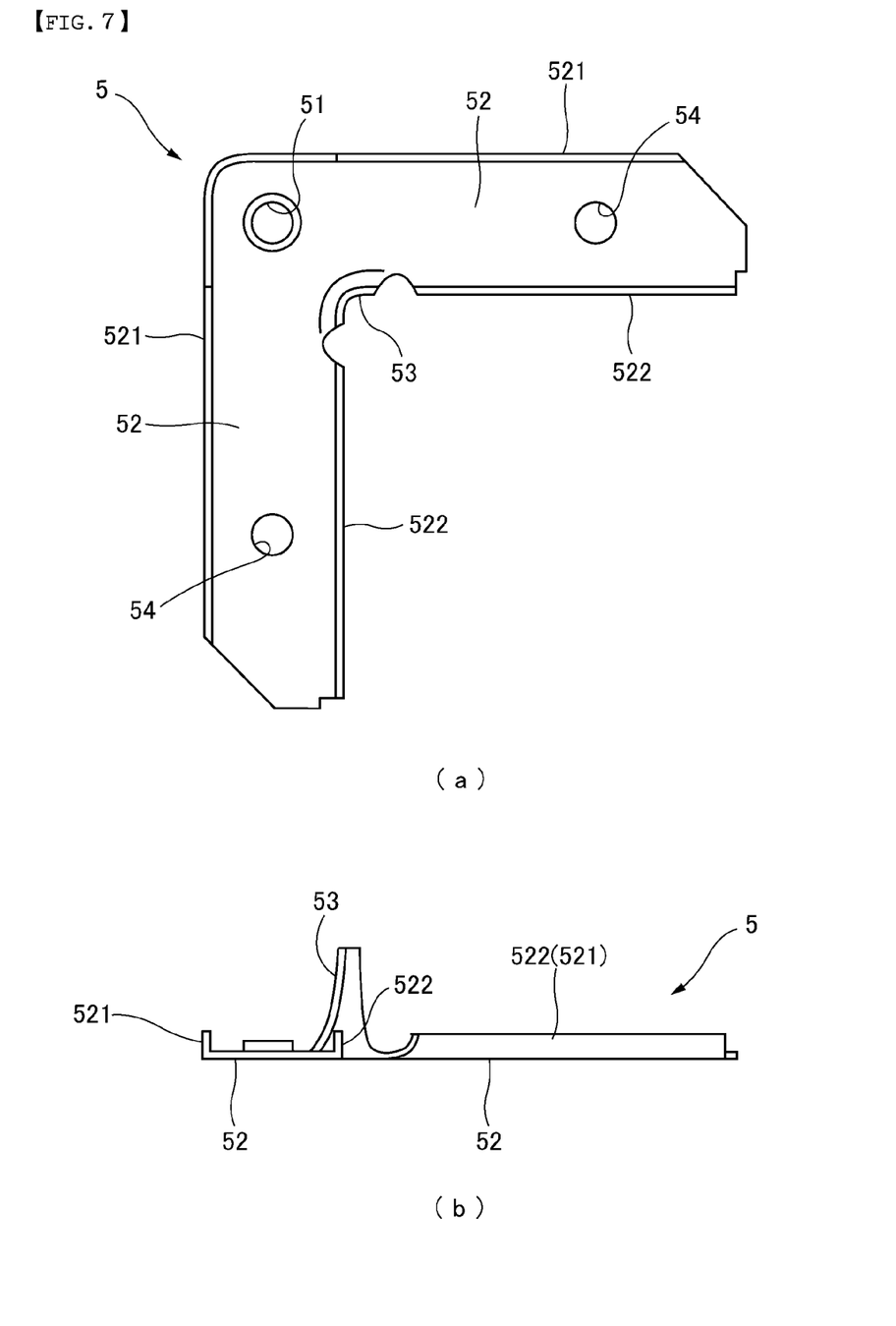
FIGS. 7(a) and 7(b) are a plan view and a front view respectively of a corner piece according to the second embodiment.
Figure 8:
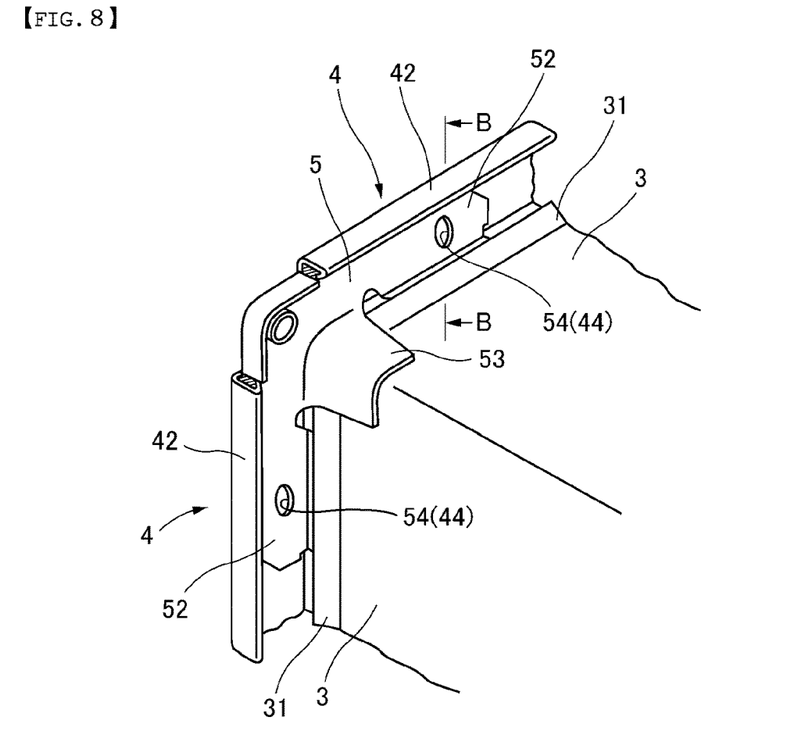
FIG. 8 is a perspective view of the flange of FIG. 4 provided with the corner piece of FIG. 7.

On the other hand, as shown in FIG. 7, the corner piece 5 is a metal fitting which has the two plate-shaped attachment portions 52 in a substantially L-shape and is arranged in each of the four corners of the opening end portion 2A of the duct body 2. The attachment portions 52 are both substantially rectangular and each have the one edge 521 as the external side edge and the other edge 522 as the internal side edge thereof. The one edge 521 and the other edge 522 rise substantially vertically to the plate surface of the attachment portion 52 into a rib shape. In the interior angle part where the two other edges 522 intersect each other, a contact portion 53 is formed, and as shown in FIG. 8, the contact portion 53 rises in the same direction that the one edge 521 and the other edge 522 rise so as to come in contact with the joint portion of the adjoining wall plates 3.

Each attachment portion 52 is formed with an attachment-portion bolt insertion hole 54 for inserting a bolt. When the corner piece 5 is arranged in a corner of the opening end portion 2A of the duct body 2, the attachment-portion bolt insertion hole 54 agrees with the bolt insertion hole 44 of the flange portion 4. Then, the flange portion 4 and the corner piece 5 are fastened together with bolts.

Figure 9:
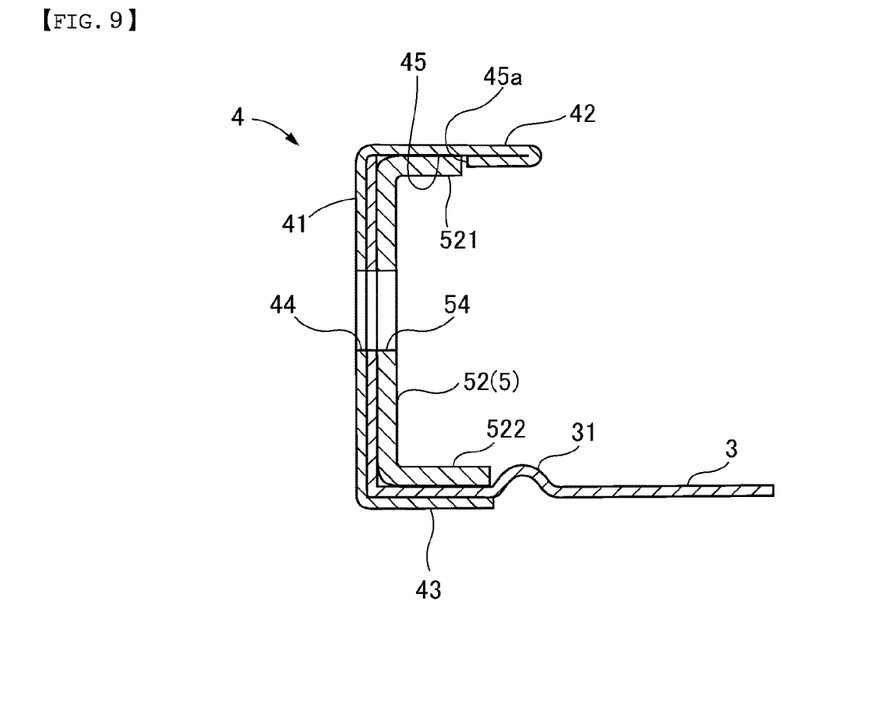
FIG. 9 is a sectional view of the flange provided with the corner piece along the B-B line of FIG. 8.

The one edge 521 of the attachment portion 52 of the corner piece 5 is attached and fixed to the cutout portion 45. Specifically, the attachment portion 52 is inserted between the horizontal portion 42 and the wall plate 3, and thereby, as shown in FIG. 9, the one edge 521 of the attachment portion 52 is fitted into the cutout portion 45 and held and fixed between the vertical portion 41 and the cutout portion edge 45*a*. In other words, the height of the vertical portion 41 and the shape of the cutout portion 45 are determined so that the one edge 521 can be fixed as described above.

On the other hand, in the same way as the first embodiment, the wall plate 3 is formed with the rib portion 31 protruding outside and extending in the longitudinal directions of the flange portion 4. The other edge 522 of the attachment portion 52 of the corner piece 5 is attached and fixed between the rib portion 31 and the vertical portion 41. Specifically, the attachment portion 52 is inserted between the horizontal portion 42 and the wall plate 3, and thereby, the other edge 522 of the attachment portion 52 is held and fixed between the rib portion 31 and vertical portion 41. In other words, the position and shape of the rib portion 31 are determined so that the other edge 522 can be fixed as described above.

Next, a manufacturing method will be described for the flange portion 4 (the duct flange structure).

Figure 10:
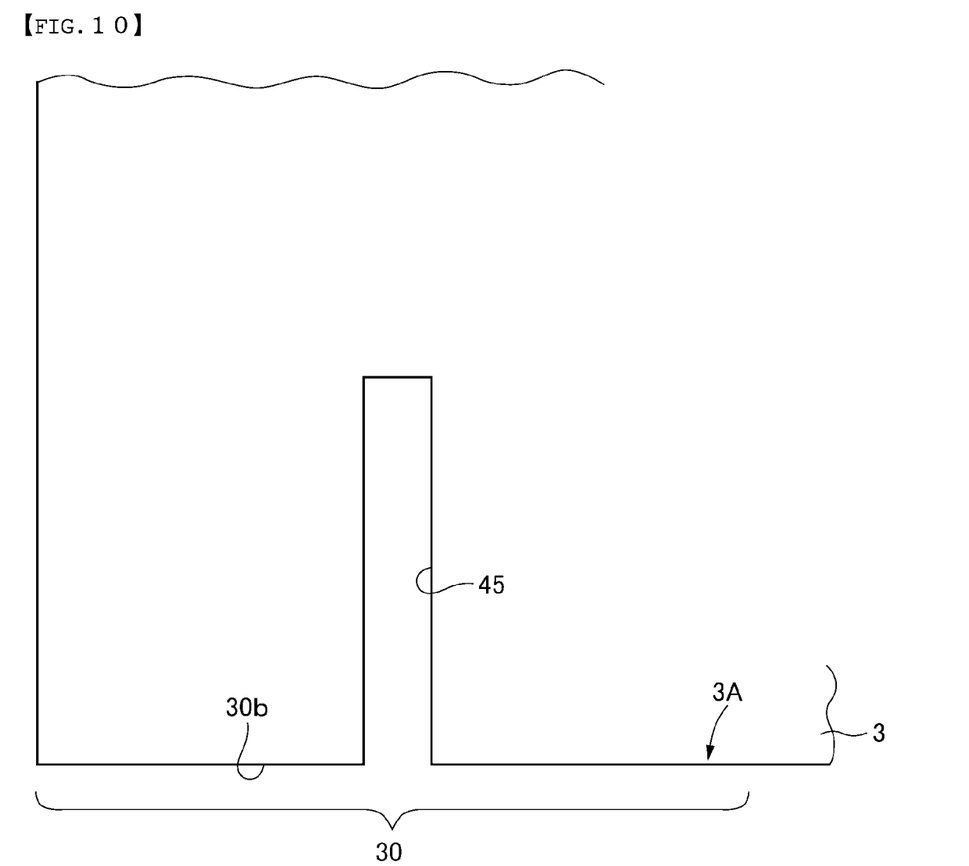
FIG. 10 is a partial plan view of a wall plate showing how to form a cutout portion in a manufacturing method for the duct flange structure according to the second embodiment.

First, as shown in FIG. 10, in the extension portion 30 equivalent to the steel plate extending from the opening edge 3A of the wall plate 3, the cutout portion 45 is formed into a slit (substantial rectangle) shape. At this time, the cutout portion 45 is formed so as to be brought to such a position as described above when the flange portion 4 has been formed.

Figure 11:
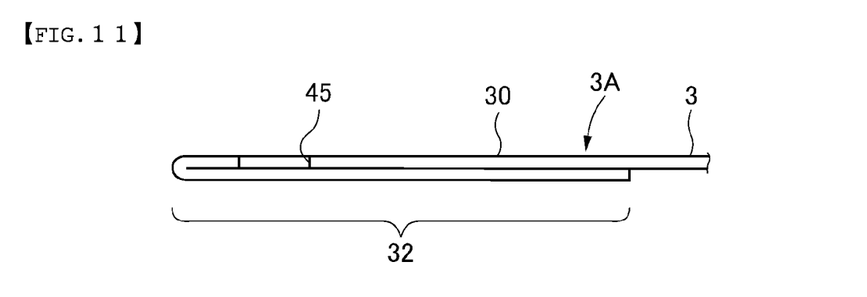
FIG. 11 is a partial side view of the wall plate showing how to form a superposition portion, following FIG. 10.

Next, in the same way as the first embodiment, as shown in FIG. 11, the extension portion 30 is folded and superposed in two to form the superposition portion 32. Thereafter, the superposition portion 32 is formed at a predetermined position thereof with the bolt insertion hole 44, and sequentially, the superposition portion 32 is bent into the vertical portion 41 and the horizontal portion 42.

In the second embodiment, as shown in FIG. 9, the one edge 521 of the attachment portion 52 of the corner piece 5 (FIG. 8) is secured and fixed within the cutout portion 45 of the horizontal portion 42. Therefore, it is unnecessary to bend (or caulk, for example) the horizontal portion 42 in order to fix the corner piece 5 to the flange portion 4, thereby lessening the labor and time. Specifically, it takes a great deal of labor and time to bend the horizontal portion 42 formed by folding and superposing the extension portion 30 of the wall plate 3 in two or more, as shown in the first embodiment, for example. In contrast, as shown in FIG. 9, the one edge 521 of the attachment portion 52 of the corner piece 5 (FIG. 8) is simply secured within the cutout portion 45, thereby fixing the one edge 521 of the attachment portion 52 to the flange portion 4 with ease and in a short time.

In addition, the other edge 522 of the attachment portion 52 of the corner piece 5 is secured and fixed between the rib portion 31 of the wall plate 3 and the vertical portion 41 of the flange portion 4. This enables the corner piece 5 to be securely fixed to the flange portion 4. To sum up, the one edge 521 of the attachment portion 52 of the corner piece 5 is secured and fixed to the cutout portion 45 and the other edge 522 of the attachment portion 52 is secured and fixed between the rib portion 31 and the vertical portion 41, so that the corner piece 5 can be securely fixed to the flange portion 4.

On the other hand, in this manufacturing method, the extension portion 30 is formed in advance with the cutout portion 45, the extension portion 30 is folded and superposed in two or more to form the superposition portion 32, and thereafter, the vertical portion 41 and the horizontal portion 42 are formed. In other words, there is no need to form the cutout portion 45 after forming the vertical portion 41 and the horizontal portion 42. Therefore, the horizontal portion 42 having the cutout portion 45 can be more easily and properly formed, so that the flange portion 4 can be manufactured more easily and at a lower cost.

Although the embodiments of the present invention have been above described, the present invention is not limited to the embodiments as specific configurations thereof. Without departing from the scope of the present invention, variations or the like in design should be included in the present invention. For example, in the above embodiments, the steel plate (the extension portion 30) of the vertical portion 41, the horizontal portion 42 and the second horizontal portion 43 is folded and superposed in two. However, the steel plate may be folded and superposed in three or more in accordance with the thickness of the steel plate, the strength required for the flange or the like.

Moreover, the edge 30a of the extension portion 30 is arranged on the internal-surface side of the wall plate 3 (inside of the duct body 2). However, the edge 30a of the extension portion 30 may be arranged on the external-surface (connection-surface) side of the vertical portion 41. This also prevents the edge 30a from being visible from the outside when the duct 1 is set in an installation place after connected to other ducts and the like.

KEY TO FIGURES 1 duct
2 duct body
2A opening end portion (end portion)
3 wall plate
3A opening edge
30 extension portion
31 rib portion
30a edge
30b side edge
32 superposition portion
4 flange portion
41 vertical portion
42 horizontal portion
43 second horizontal portion
44 bolt insertion hole
45 cutout portion
5 corner piece
52 attachment portion
521 one edge
522 other edge

The invention claimed is:

1. A monolithic duct flange structure formed monolithically with an end of a duct body having four plate portions arranged in a quadrilateral cross-sectional shape, the duct flange structure comprising: a first extending flange portion extending in a first direction of extension from an opening edge of each of the four plate portions of the duct body; a second extending flange portion extending from the first extending flange portion in a second direction of extension, the second direction of extension being perpendicular to the first direction of extension and having a cutout formed therein; and a third extending flange portion extending from the second extending flange portion in a third direction, the third direction being parallel to the second direction of extension, wherein the second extending flange portion and the third extending flange portion form a partial double wall, wherein when the duct flange structure is fully formed, the cutout forms an enclosed recessed pocket which is configured to retain a portion of a reinforcing corner piece.

2. The duct flange structure according to claim 1, wherein the second extending flange portion is folded and superposed with the third extending flange portion.

3. The duct flange structure according to claim 1, wherein the first extending flange portion is formed with a bolt insertion hole for inserting a bolt into the first extending flange portion.

4. The duct flange structure according to claim 1, wherein the opening edge of the first extending flange portion is inside of the duct body.

5. The duct flange structure according to claim 1, wherein:
the second extending flange portion is configured with a side edge; and
the corner piece is provided in a corner of the end portion of the duct body, the corner piece having two plate-shaped attachment portions in a L shape, one edge of each attachment portion being attached and fixed to the cutout formed therein the second extending flange portion.

6. The duct flange structure according to claim wherein:
the duct body, is configured with four wall plates respectively adjoined to the four plate portions;
each of the wall plates are formed with a rib portion protruding to an outside of the duct body; and
the other edge of each attachment portion of the corner piece is attached and fixed between the rib portion and the first extending flange portion.

7. The duct flange structure of claim 1, further comprising a rib portion extending along a direction perpendicular to the first direction of extension and the second direction of extension, wherein the rib portion and the cutout are configured to retain the corner piece.

8. The duct flange structure of claim 1, further comprising a rib portion, wherein the rib portion and the enclosed recessed pocket are configured to retain the corner piece.

9. A manufacturing method for the duct flange structure according to claim 1, comprising the steps of:
folding and superposing the extension portion in two or more to form a superposition portion; and
bending the superposition portion to form the vertical portion and the horizontal portion.

10. A manufacturing method for the duct flange structure according to claim 5, comprising the steps of:
forming the extension portion with the cutout portion;
folding and superposing the extension portion in two or more to form a superposition portion; and bending the superposition portion to form the vertical portion and the horizontal portion.

* * * * *